Patented Nov. 27, 1951

2,576,279

UNITED STATES PATENT OFFICE 2,576,279

4,6 - DIKETO - 5,5 - DISUBSTITUTED PYRIMIDINES AND PROCESS FOR PREPARING SAME

William R. Boon, Herbert C. Carrington, and Charles Henry Vasey, Blackley, Manchester, England, assignors to Imperial Chemical Industries Limited, a corporation of Great Britain No Drawing. Application July 11, 1950, Serial No. 173,248. In Great Britain July 27, 1949

14 Claims. (Cl. 260—260)

This invention relates to new pyrimidine derivatives which we have found to possess anti-convulsant properties.

According to our invention we provide the said new pyrimidine derivatives, namely compounds of the general formula:

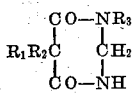

wherein $R_1$ stands for a monocyclic carbocyclic radical or for an alkenyl radical of not more than 3 carbon atoms, $R_2$ stands for an alkyl radical or an alkenyl radical of not more than 3 carbon atoms and $R_3$ stands for hydrogen or an alkyl radical of not more than 4 carbon atoms.

According to a further feature of the invention we provide a process for the manufacture of the said new pyrimidine derivatives which comprises reduction of a compound of the formula

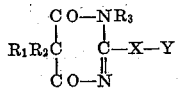

wherein X stands for oxygen or for sulphur and whereby Y stands for hydrogen, or, where X stands for sulphur, an alkyl radical.

It will be understood that when Y stands for hydrogen the compounds of the above formula may also be written:

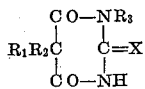

The reduction of the said compounds may, for example be brought about by means of hydrogen, either electrolytically or by means of hydrogen in presence of a catalyst, for example of Raney nickel.

According to yet a further feature of the invention we provide a process for the manufacture of the said new pyrimidine derivatives which comprises condensation of a malondiamide derivative of the formula

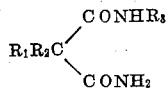

wherein $R_1$, $R_2$ and $R_3$ have the meaning set forth above, with formamide.

The said condensation may be brought about conveniently by heating the reactants together.

In experimental animals the said new pyrimidine derivatives show such anti-convulsant properties as to render them of potential value in the control of epilepsy. The said anti-convulsant properties are superior to those shown by the corresponding barbituric acid from which the new pyrimidine derivatives are, or may be regarded as being, derived.

The invention is illustrated but not limited by the following examples in which the parts are by weight.

Example 1

50 parts of Raney nickel are added to a solution of 10 parts of 5-phenyl-5-ethyl-2-thiobarbituric acid in 250 parts of ethanol and the mixture is boiled under reflux for one hour. It is then filtered, the residue is extracted with hot ethanol and the extract is added to the filtrate. The combined liquid is then evaporated to one tenth of its volume and is then cooled and filtered. The crystalline solid residue is 5-phenyl-5-ethylhexahydropyrimidine-4,6-dione of M. P. 281–282° C.

Example 2

50 parts of α,α-phenylethylmalondiamide and 150 parts of formamide are boiled together under reflux for 2 hours. The mixture is then cooled to 0° C. and filtered. The solid residue is washed with 50 parts of ethanol and then crystalised from 660 parts of an 80% ethanol/water mixture. There is obtained 5-phenyl - 5 - ethylhexahydropyrimidine-4,6-dione, M. P. 281–282° C.

Example 3

7.5 parts of 2-methylthio-5-phenyl-5-ethyltetrahydropyrimidine - 4,6 - dione, 200 parts alcohol and 30 parts of freshly prepared Raney nickel are boiled together under reflux for one hour. The mixture is then filtered while still hot and the filtrate is evaporated to small volume and cooled. 5-phenyl-5-ethylhexahydropyrimidine-4,6-dione is filtered off and has M. P. 280° C.

The 2 - methylthio-5 - phenyl - 5 - ethyltetrahydropyrimidine-4,6-dione, M. P. 152° C., used in the process of this example may be obtained from 5-phenyl-5-ethyl-2-thiobarbituric acid by reaction with methyl iodide in aqueous alcoholic sodium hydroxide.

Example 4

5 parts 5-phenyl-5-ethylbarbituric acid are suspended in 100 parts of 80% sulphuric acid in a porous cell. This cell is then immersed in 60% aqueous sulphuric acid. A sheet of lead is placed in the 60% acid and is connected to the positive terminal of a 12-volt battery. A lead pipe is placed in the 80% acid and is connected to the negative terminal of the same battery; the temperature of the acid is maintained below 50° C. by cooling. After 150 minutes the contents of the cell are poured onto ice and the mixture is filtered. The residue is crystallised from ethanol and 5-phenyl-5-ethylhexahydropyrimidine-4,6-dione, M. P. 281-2° C., is obtained.

Example 5

16 parts α,α-phenylmethylmalondiamide (M. P. 150-151° C.) and 55 parts of formamide are boiled together under reflux during 90 minutes. The mixture is then cooled and is filtered. The solid residue is crystallised from 80% aqueous ethyl alcohol and there is obtained 5-phenyl-5-methylhexahydropyrimidine - 4,6 - dione, M. P. 295-6° C.

There have also been obtained by processes similar to that of the above example, save that there is used in place of the 16 parts of α-phenyl-α-methylmalondiamide a corresponding quantity of the appropriately substituted malondiamide, 5 - phenyl-5-n-propylhexahydropyrimidine - 4,6-dione, M. P. 308-9° C., 5-phenyl-5-isopropylhexahydropyrimidine-4,6-dione, M. P. 303° C., 5 - phenyl-5-allylhexahydropyrimidine - 4,6 - dione, M. P. 295-6° C., and 5-cyclohexyl-5-n-propylhexahydropyrimidine-4,6-dione, M. P. 320° C.

The appropriately substituted malondiamides used in making the compounds mentioned above may be obtained from the correspondingly substituted malonic esters by hydrolysis with aqueous alcoholic sodium hydroxide to give the corresponding malonic acids which are converted by means of phosphorus pentachloride to the malonyl chlorides and these are finally reacted with aqueous ammonia. There were thus obtained, for example, α-phenyl-α-n-propylmalondiamide, M. P. 173° C., α,α-phenylisopropylmalondiamide, M. P. 222° C., α,α-phenylallylmalondiamide, M. P. 107°-110° C., and α,α-cyclohexyl-n-propylmalondiamide, M. P. 240-241° C.

Example 6

15 parts of 5-phenyl-5-isopropyl-2-thiobarbituric acid, 250 parts of ethyl alcohol and 25 parts of freshly prepared Raney nickel are boiled together under reflux for 4 hours. The mixture is then filtered while still hot and the filtrate is evaporated to small volume in vacuo and cooled and filtered. The solid consists of 5-phenyl-5-isopropylhexahydropyrimidine-4,6-dione, M. P. 303° C.

There have also been obtained by processes similar to that of the above example, save that there is used in place of the 5-phenyl-5-isopropyl-2-thiobarbituric acid a corresponding quantity of other appropriately substituted 2-thiobarbituric acids, 5-phenyl-5-ethylhexahydropyrimidine-4,6-dione, M. P. 281° C., 5-cyclohexyl-5-ethylhexahydropyrimidine-4,6-dione, M. P. 301-2° C. and 5-cyclohexyl-5-n-propylhexahydropyrimidine-4,6-dione, M. P. 320° C.

The 5,5-disubstituted-2-thiobarbituric acids used in making the pyrimidine derivatives as described above may be obtained by condensation of the appropriately substituted malonic esters with thiourea. There were thus obtained 5-phenyl-5-methyl-2-thiobarbituric acid, M. P. 210° C., 5-phenyl-5-isopropyl-2-thiobarbituric acid, M. P. 186-187° C., 5-cyclohexyl-5-ethyl-2-thiobarbituric acid, M. P. 188-189° C., and 5-cyclohexyl-5-n-propyl-2-thiobarbituric acid, M. P. 142-144° C.

Example 7

17 parts of α,α-phenylethyl-N-ethylmalondiamide and 120 parts of formamide are boiled together under reflux for 90 minutes. The mixture is then cooled, water is added and the mixture is then filtered. The residue is crystallised from water and 5-phenyl-1,5-diethylhexahydropyrimidine-4,6-dione is obtained, M. P. 135-6° C.

By the process of the above example, using in place of the α,α-phenylethyl-N-ethylmalondiamide, other appropriately substituted N-alkylmalondiamides, there have been obtained: 5-phenyl - 1,5 - dimethylhexahydropyrimidine-4,6-dione, M. P. 174° C., 5-phenyl-5-methyl-1-n-propylhexahydropyrimidine - 4,6 - dione, M. P. 150-151° C., 5-phenyl-5-ethyl-1-methylhexahydropyrimidine-4,6-dione, M. P. 185-186° C., 5-phenyl-5-ethyl-1-n-propylhexahydropyrimidine-4,6-dione, M. P. 124-125° C. and 5-phenyl-5-n-propyl-1 - methylhexahydropyrimidine - 4,6 - dione, M. P. 166-167° C.

The α,α - phenylalkyl - N - alkylmalondiamides used in the process of the above examples may be obtained from the appropriately α,α-disubstituted ethyl cyanacetates by action firstly of aqueous alcoholic amines to give the α,α-phenylalkyl-N-alkylcyanoacetamides which are then converted to the diamides by means of cold concentrated sulphuric acid. There are thus obtained α,α-phenylmethyl - N - methylmalondiamide, M. P. 153° C., α,α-phenylmethyl-N-n-propylmalondiamide, M. P. 81° C., α,α-phenylethyl-N-methylmalondiamide, M. P. 144-145° C., α,α-phenylethyl-N-ethylmalondiamide, M. P. 126-127° C., α,α-phenylethyl-N-n-propylmalondiamide, M. P. 106-107° C. and α,α-phenyl-n-propyl-N-methylmalondiamide, M. P. 114-116° C.

Example 8

1 part of α,α-diallylmalondiamide is boiled under reflux for one hour with 4 parts of formamide. The mixture is then cooled and filtered. The solid residue is crystallised from aqueous ethanol and 5,5-diallylhexahydropyrimidine-4,6-dione is obtained, of M. P. 314-5° C.

What we claim is:

1. New pyrimidine derivatives possessing anticonvulsant properties and having the general forula

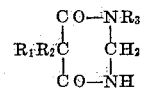

wherein $R_1$ stands for a radical selected from the group consisting of monocyclic carbocyclic radicals of six carbon atoms and alkenyl radicals of from 1 to 3 carbon atoms, $R_2$ stands for a radical selected from the group consisting of alkyl radicals of from 1 to 3 carbon atoms and alkenyl radicals of from 1 to 3 carbon atoms and $R_3$ stands for a radical selected from the group consisting of hydrogen and alkyl radicals of from 1 to 4 carbon atoms.

2. 5 - phenyl - 5 - ethylhexahydropyrimidine-4,6-dione.

3. Process for the manufacture of new pyrimidine derivatives having the general formula

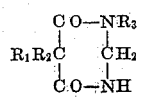

wherein $R_1$ stands for a radical selected from the group consisting of monocyclic carbocyclic radicals of six carbon atoms and alkenyl radicals of from 1 to 3 carbon atoms, $R_2$ stands for a radical selected from the group consisting of alkyl radicals of from 1 to 3 carbon atoms and alkenyl radicals of from 1 to 3 carbon atoms and $R_3$ stands for a radical selected from the group consisting of hydrogen and alkyl radicals of from 1 to 4 carbon atoms, which comprises reduction of a compound of the formula

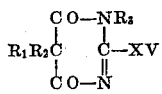

wherein $R_1$, $R_2$ and $R_3$ have the meaning stated above, X stands for a radical selected from the group consisting of oxygen and sulphur and Y stands for a radical selected from the group consisting of hydrogen and alkyl radicals.

4. The process of claim 3 wherein the reduction is brought about by means of hydrogen.

5. The process of claim 3 wherein the reduction is brought about electrolytically.

6. The process of claim 3 wherein the reduction is brought about by means of hydrogen in the presence of a catalyst.

7. The process of claim 3 wherein the reduction is brought about by means of Raney nickel.

8. Process for the manufacture of 5-phenyl-5-ethylhexahydropyrimidine-4,6-dione which comprises reduction of 5-phenyl-5-ethylbarbituric acid.

9. Process for the manufacture of 5-phenyl-5-ethylhexahydropyrimidine-4,6-dione which comprises reduction of 5-phenyl-5-ethyl-2-thiobarbituric acid.

10. Process for the manufacture of 5-phenyl-5-ethylhexahydropyrimidine-4,6-dione which comprises reduction of a 2-alkylthio-5-phenyl-5-ethyltetrahydropyrimidine-4,6-dione.

11. 5 - phenyl - 1,5 - diethylhexahydropyrimidine-4,6-dione.

12. 5 - phenyl - 5 - methylhexahydropyrimidine-4,6-dione.

13. 5 - phenyl - 5 - ethyl - 1 - n-propylhexahydropyrimidine-4,6-dione.

14. 5 - phenyl - 5 - ethyl - 1 - methylhexahydropyrimidine-4,6-dione.

WILLIAM ROBERT BOON.
HERBERT C. CARRINGTON.
CHARLES HENRY VASEY.

No references cited.